March 30, 1954

C. L. ROBERTS 2,673,511

BEDDING TOOL

Filed Dec. 22, 1950

INVENTOR
Clark L. Roberts,

BY Ralph T. Bassett.

ATTORNEY

Patented Mar. 30, 1954

2,673,511

UNITED STATES PATENT OFFICE 2,673,511

BEDDING TOOL

Clark L. Roberts, Nampa, Idaho

Application December 22, 1950, Serial No. 202,163

5 Claims. (Cl. 97—225)

This invention relates to improvements in bedding tools adaptable for use with tractors or other implements equipped with a tool bar and comprehends a structure including a runner assembly and adjustable wings for preparing the soil for seeding between furrows or small ditches made previous to the planting of crops for the purpose of supplying water, this arrangement being particularly desirable in certain irrigated areas where relatively large acreage of vegetable seeds are raised for seed houses.

One of the objects of the invention is to provide an attachment in which an adjustable wing and runner assembly comprehends both the adjustment of the wings and of the runner, and the replacement of each and all of the parts available in the assembly, it being understood by those skilled in the art that certain parts, such as the shoe which cuts the groove and the tapered runner which smooths the furrow immediately behind the shoe, inherently are subjected to more wear than the other parts such as the wings associated with the runner, and therefore such parts are so assembled as to not only be relatively adjustable but quickly replaceable where necessary.

A further object of the invention is to provide a standard with an attaching bracket for securing the same to a tool bar of a tractor or other implement, whereby the standard may be adjusted either vertically or laterally when desired.

Another object of the invention is to provide a brace rod between the runner and the standard, the brace rod being provided with a compression spring for maintaining an even tension on the runner and wings at all times for conforming the parts properly to the soil.

Other features such as the adjustable arrangement between the runner and the wings, the pivotal mounting of the runner to the standard, provide novelty and new functions and operations in the assembly by means of which the structure is more adaptable for the work, and tends to maintain the parts in their proper relation and adjustment at all times.

Further objects of the invention will more clearly hereinafter appear by reference to the accompanying drawings and specification, wherein like characters of reference designate corresponding parts throughout the several views, in which:

Fig. 1 is a perspective view of the assembly in position on the tool bar of a tractor;

Fig. 2 is a side elevation of the device with the tractor bar in section;

Fig. 3 is a section on line 3—3 of Fig. 2;

Fig. 4 is a section on line 4—4 of Fig. 3; and

Fig. 5 is an enlarged detail section through the shoe and supporting frog.

While this invention is capable of use and attachment on any conventional type of power equipment, it is in the present instance illustrated as associated with and applied to the tool bar on a tractor.

In Fig. 1 the tractor is shown in dotted line and the tractor wheels are indicated by reference character A. The tool bar is indicated by reference character B and this tool bar is supported from the tractor in the usual manner by the upper frame member C and the lower spaced frame members D and D'. The tool bar B is square in cross section and the various units comprising the present invention are mounted on the bar for vertical and transverse adjustment by means of a clamp formed of a pair of U-shaped bracket elements having angular faces for engaging the bar. One of the U-shaped bracket elements includes the spaced side walls 1 and 2 and connecting rear walls 3. This section of the bracket is adapted to embrace the standard 4 of the assembly and to be bolted thereto by spaced screws 5 and 6 which are threaded through the bosses 7 and 8 in the plate 2. The outer free edges of the plates 1 and 2 are formed with V-notches 9 which are adapted to embrace one-half of the horizontal tool bar B carried by the tractor. The outer attaching bracket section is of U-shape in cross section including side walls 10 and 11, rear wall 12 and the free inner faces of the walls 10 and 11 are formed with the V-notches 14 to fit the opposite side of the tool bar, and this outer bracket section is urged into engagement with its associated bracket section and with the tool bar by means of bolts 15 and nuts 16, the bolts being associated with a transverse plate 16'. By adjusting the screws 5 and 6 the standard 4 can be moved vertically and by loosening the attaching bracket sections by freeing the nuts 16, the standard 4 can be adjusted transversely of the tool bar B to position the devices in pre-determined spaced relation. The vertical adjustment is provided to regulate the depth of the furrow which is formed, while the transverse adjustment of the standard on the tool bar is to position the device with respect to the furrows or small ditches which are normally used to feed water at regular intervals between the rows of seeds. The standards 4 are in the form of elongated steel bars, shown in the present instance as rectangular in cross section, and each of which has its lower extremity bent forwardly to accommodate the application of the supporting frog and shoe defining the shovel assembly.

The shovel assembly includes a supporting frog having its main length of general channel form and the side walls 17 and 18 of this channel embracing the forwardly projecting lower end portion of the standard 4. The bottom end portion of the frog structure is closed and of general arcuate form as shown at 19 to form a base for receiving the shoe 20 which is of arcuate cross section and forwardly and downwardly tapered to provide a cutting nose 21. The shoe can be bolted or riveted to the bottom or base of the frog as desired, it being preferable that the securing means be such as to permit removal and replacement of the shoe when it has been worn due to excessive use. To the rear face of the forwardly inclined lower end portion of the standard 4 is secured the hinge plate 22, this plate being of the same width as the rear face of the standard 4 and having a medial transverse hinge projection 23 with bolt openings 24 at each side of the hinge projection for receiving the bolts 25, which latter project through and secure both the frog and the hinge plate to the forwardly inclined shank of the standard 4, as shown in Fig. 3.

Pivoted or hinged to the hinge projection 23 of the plate 22 is the tapered runner 26, this runner being of channel form and made of relatively heavy sheet metal. It will be noted that this tapered channel is relatively wide at the rear and the side walls are tapered, inwardly and forwardly, as shown best in Fig. 3, to a width approximately the width of the standard 4 so that the forward end portions of the side walls of the channel are capable of telescoping with respect to the standard 4 when the runner is swung on its pivot and against the tension of a brace rod to be hereinafter described. The side walls of the runner, indicated by reference characters 27 and 28, as shown in Fig. 2, are formed with a series of transversely aligned perforations 29 and 29' at their front portions and rear end portions, the perforations 29 at the rear end portions of the side walls being arranged arcuately to compensate for the swinging adjustment of the wings 30 and 31. The side walls 27 and 28 are also formed at a point approximately intermediate the perforations with aligned arcuate slots 32 to receive the connecting guide rod 32'. The wings 30 and 31 are of angular form with diagonal front end portions 33 flared upwardly as best shown in Fig. 2. The wings include flanges 34 which are suitably perforated to receive bolts 35 by means of which the wings are adjusted at their front and rear ends in accordance with the nature and requirement of the work, it being desirable that the rear end portions of the wings be lower than the front ends to provide inclined smoothing faces for gradually conforming the dirt in a compact and regular manner. A plate brace 37 is arranged between the walls 27 and 28 of the runner, this plate being slightly inclined and welded at its ends with the walls, and being medially perforated to receive the end of a rod 38, the upper end 39 of which is pivoted by means of a bolt 40 to clamp plates 41 embracing the shank of the standard 4. The rod is provided with a stop washer 42, and between the stop washer 42 and the plate 37 a coiled spring 43 is arranged which normally applies pressure to the rear end of the runner structure to urge the latter downwardly on its pivot which is preferably in the nature of a bolt 44 which extends through the side walls of the runner and through the hinge projection 23 of the hinge plate 22.

The present structure is designed primarily for use in the irrigating of small seeds, such as the seeds of radishes, carrots, onions, lettuce, parsnips, etc., which must not be planted too deep and which are to be planted in rows between furrows or small ditches which have been formed by this implement for the flow of water from feeder irrigation ditches. In forming these furrows for the sub-irrigation of such seeds as mentioned above, it is required that a groove be cut for the application of water in predetermined widths and depths in relation to the variety of the crop to be planted. By having the standard 4 vertically adjustable to regulate the depth of the groove and transversely adjustable to provide the proper spacing with respect to the width of the rows, extremely accurate planting can be obtained. With the tool properly adjusted the tractor will be moved with the wheels following the direction of the flow of the water with the cutting shoe forming a groove. As the groove is cut the runner 26 follows the cut and due to the fact that its rear end is inclined downwardly and outwardly the runner gradually smooths the furrow which the shovel shoe has opened, the side walls 27 and 28 pressing the side walls of the groove as well as the bottom, sufficiently compacting the earth so that the grooves will hold their shape throughout the irrigation season. Simultaneously, the wings 30 and 31 which are pressed downwardly and inclined rearwardly smooth the top and the edges of the furrows formed by the shovel shoe 20 and level the bed between the furrows, thus leaving a highly satisfactory condition for seeding. It will be obvious that the wings are adjusted to accommodate the nature of the groove or furrow and any number of adjustments may be provided by a suitable arrangement of perforations 29 and 29', the wings being set in accordance with the depth which is required for the particular seed being planted. The brace rod 38 and the compression spring 43 provided thereon keep a predetermined tension on the runner and wings at all times and permit the device to conform to the nature of the soil and prevent deformation of the structure which might otherwise occur. Due to the structure and nature of the work it will be obvious that all of the parts are replaceable and particularly the shoe or shovel 20 and the runner 26, which obviously will receive more of the wear because of the nature of the work involved.

What I claim is:

1. In a device of the character described, a standard having a forwardly extending angular lower extremity, a frog member embracing the sides and forward wall of the lower extremity of said standard, said frog including an arcuate downwardly inclined bottom portion, an elongated shoe having an arcuate outer face and spaced parallel sidewalls secured to the bottom portion of said frog, a hinge element positioned at the rear of the angular portion of said standard, fastening means extending through the lower end of the standard and securing the frog and hinge element thereto, a channel shaped forwardly tapered runner hingely connected to said hinge member by a pin connecting the side front wall portions of said runner medially of their height, said pin limiting the lateral movement of said front walls, wings supported by the side walls of said runner, said wings including downwardly extending flanges abutting the sidewalls of said runner, and forwardly tapered horizontal portions, the forward portions of said wings having their outer corner portions deflected upwardly, and said wings being mounted for vertical and angular adjustment.

2. In a device of the character described, a standard having flat side wall portions, a frog mounted at the lower end of said standard and having flat portions embracing and secured to said side walls and a rounded bottom portion, an elongated shoe of arcuate cross section rigidly secured to said rounded bottom portion, said shoe tapering forwardly and extending downwardly from said rounded portion, a channel shaped runner having forwardly and inwardly tapered side walls pivoted to the rear of said standard and having its bottom face above the forward end of said shoe, the side walls of said runner being spaced at their forward end to embrace the flat side walls of the standard in normal operating position, a supporting arm connecting the rear portion of said runner and the upper portion of said standard, a compression spring arranged on said supporting arm and normally urging said runner in a downward direction, and wing members connected to the side walls of said runner, said wing members including vertical flanges and horizontal earth working portions, said vertical flanges being connected to the side walls of said channel shaped runner for vertical and angular adjustment, and said horizontal earth working portions having their forward outer portions deflected upwardly.

3. The structure of claim 2 characterized in that the pivoting means for connecting the channel shaped runner comprises a bolt extending through the side walls of the runner and providing brace means therefor.

4. In an adjustable wing and runner assembly, a standard for connection with a tool bar, said standard including an elongated shank portion and an angular forwardly projecting lower extremity, a clamp plate embracing the side walls and forward wall of the angular portion of said standard and including a rounded base portion enclosing the end wall of the standard, an elongated shoe having a rounded inner surface for seating engagement with said rounded base portion, said shoe tapering forwardly and extending downwardly from said base portion, a runner of channel form supported from the rear wall of the angular portion of the standard and in longitudinal alignment therewith, the bottom surface of said runner being inclined rearwardly and lying in a plane above the forward end of said shoe, said supporting means including a pivot bar fixed to the rear wall of the standard and a bolt passing through the side walls of the channel and through the pivot bar, a plurality of aligned perforations at the forward end of the side walls of the channel, a plurality of vertically arranged, transversely aligned openings formed in the side walls at the rear end portion of the runner, wing elements for attachment to each of the side walls of the channel, said wing elements including downwardly extending angles and horizontal earth working portions, said earth working portions including forwardly and upwardly flared tapered extremities, and removable fastenings connecting the flanges of said wings at their front and rear ends through the openings formed in the side walls of the channel.

5. The structure of claim 4 characterized in that the side walls of the channel are braced at their rearward portions by a flat angular plate fixed therebetween, and a brace rod having a one-way connection with said plate connecting the same with the upper portion of the standard, the brace rod supporting a compression spring which normally engages the cross brace and urges the runner downwardly.

CLARK L. ROBERTS.

References Cited in the file of this patent
UNITED STATES PATENTS

| Number | Name | Date |
|---|---|---|
| 469,434 | Highfill | Feb. 23, 1892 |
| 580,250 | Calton | Apr. 6, 1897 |
| 585,962 | Mavis | July 6, 1897 |
| 713,228 | Littler | Nov. 11, 1902 |
| 1,122,899 | Funk | Dec. 29, 1914 |
| 1,818,529 | Bockwitz | Aug. 11, 1931 |
| 1,819,899 | Koebel | Aug. 18, 1931 |
| 2,424,820 | Hall | July 29, 1947 |